(12) United States Patent
Wriggle et al.

(10) Patent No.: US 11,434,668 B1
(45) Date of Patent: Sep. 6, 2022

(54) DETAINEE MONITOR RESTRAINT

(71) Applicants: Steven D. Wriggle, Schertz, TX (US); Dorothy J. Wriggle, Alvin, TX (US)

(72) Inventors: Steven D. Wriggle, Schertz, TX (US); Dorothy J. Wriggle, Alvin, TX (US)

( * ) Notice: Subject to any disclaimer, the term of this patent is extended or adjusted under 35 U.S.C. 154(b) by 0 days.

(21) Appl. No.: 17/739,082

(22) Filed: May 7, 2022

(51) Int. Cl.
- *E05B 75/00* (2006.01)
- *G01S 19/14* (2010.01)
- *H04R 1/08* (2006.01)

(52) U.S. Cl.
CPC ............. *E05B 75/00* (2013.01); *G01S 19/14* (2013.01); *H04R 1/08* (2013.01)

(58) Field of Classification Search
CPC ............ E05B 75/00; G01S 19/14; H04R 1/08
See application file for complete search history.

(56) References Cited

U.S. PATENT DOCUMENTS

| | | | | |
|---|---|---|---|---|
| 2,516,878 A * | 8/1950 | Howe | ............... | E05B 75/00 70/16 |
| 4,287,731 A | 9/1981 | Kruger | | |
| 4,748,875 A | 6/1988 | Lang | | |
| 5,138,852 A * | 8/1992 | Corcoran | ............ | E05B 75/00 70/16 |
| 5,697,231 A * | 12/1997 | Tobin, Jr. | ............ | E05B 75/00 70/16 |
| 6,619,077 B1 * | 9/2003 | Robinson | ............ | E05B 75/00 70/16 |
| 7,629,892 B1 * | 12/2009 | DeMott | ............... | E05B 75/00 70/16 |
| 8,353,183 B1 * | 1/2013 | Lofgren | ............... | E05B 75/00 70/16 |
| 8,839,796 B2 * | 9/2014 | Reese | ................. | E05B 75/00 70/16 |
| 8,904,832 B1 * | 12/2014 | Rodriguez | ............ | E05B 75/00 70/16 |
| 10,480,909 B1 * | 11/2019 | Brown | .................. | E05B 75/00 |
| 11,286,693 B2 * | 3/2022 | Heiney | ................. | E05B 75/00 |
| 2006/0272366 A1 * | 12/2006 | Kim | ..................... | E05B 75/00 70/16 |
| 2012/0085135 A1 * | 4/2012 | Louden | ................ | E05B 75/00 70/16 |
| 2015/0176313 A1 * | 6/2015 | Hines | ................... | E05B 75/00 70/16 |
| 2017/0010663 A1 | 1/2017 | Tanaka et al. | | |

* cited by examiner

*Primary Examiner* — Christopher J Boswell
(74) *Attorney, Agent, or Firm* — Donald J. Ersler

(57) ABSTRACT

A detainee monitor restraint preferably includes a detainee restraint and a law enforcement control device. The detainee restraint preferably includes a first cuff member, a second cuff member, a cuff connecting member and a monitoring device. Each cuff member preferably includes a base member, a first ratcheting arm and a second ratcheting arm. An end of the second ratcheting arm includes a plurality of ratchet teeth. A base ratchet pawl is located in the base member. The cuff connecting member preferably includes a wire cable, a first ball formed on a first end and a second ball formed on a second end. The first and second balls are retained in first and second base members. The monitoring device is retained on one of the base members. The monitoring device preferably includes a microprocessor-based circuit, a plurality of body sensors, a transceiver and a battery.

20 Claims, 3 Drawing Sheets

DETAINEE MONITOR RESTRAINT

BACKGROUND OF THE INVENTION

1. Field of the Invention

The present invention relates generally to law enforcement detention and more specifically to a detainee monitor restraint, which improves upon prior art handcuffs, while providing the addition of monitoring features.

2. Discussion of the Prior Art

Billions of dollars are spent annually in lawsuits, because restrained individuals suffer medical issues and are injured or die because of the restraint. The technology of monitoring individuals for health issues is currently available. Many times, those who have committed a crime may be experiencing mental health, neurologic, elicit or prescribed drug induced issues. With physiological, neurologic, physical, or underlying health problems whether revealed, known, or not known. Law enforcement officers are not emergency medical technicians (EMT), they are provided basics (bleeding control, stabilization, CPR/AED. While part of law enforcements routine training includes this basic training, dealing with or recognizing real health issues such as underlying complications in the field or during transport i.e., (neurologic, vascular, cardiac, pulmonary etc.) is dedicated those trained such EMT Paramedics.

During apprehension and while subduing a suspect; both officer of the law and the detainee are experiencing "extreme" biological and physiological effects, such as an adrenaline rush. In addition, to the medical and knowledge issues mentioned above, the present invention is predicated again on retraining high risk detainees, and mitigating known methodologies for escaping. The methods of escape include breakage or slipping out of the restraints, the commonly used linked chain or the chains interior retainer pin, picking the locking mechanism, and faking health or medical conditions while wearing the restraints. Law enforcement has adopted the use of body-worn cameras. However, body-worn cameras do not help in post capture and detainment. U.S. Pat. No. 4,287,731 to Kruger discloses handcuffs. U.S. Pat. No. 4,748,875 to Lang discloses a ratchet box wrench with offset handle. Patent Publication No. 2017/0010663 to Tanaka et al. discloses smart wearable devices and methods for optimizing output.

Accordingly, there is clearly felt need in the art for a detainee monitor restraint, which strengthens and improves the design of existing handcuffs to make it harder to escape the handcuffs; provides feedback of the health of the detainee; the location of the detainee; and reduce or mitigate liability from detainee lawsuits.

SUMMARY OF THE INVENTION

The present invention provides a detainee monitor restraint, which improves upon prior art handcuffs, while providing the addition of monitoring features. The detainee monitor restraint preferably includes a detainee restraint and a law enforcement control device. The detainee restraint preferably includes a first cuff member, a second cuff member, a cuff connecting member, a monitoring device and a taser. Each cuff member preferably includes a base member, a first ratcheting arm and a second ratcheting arm. The base member includes a base portion and an arm portion. The arm portion includes a curved length. The arm portion extends outward from the base portion. The first ratcheting arm includes a curved length. One end of the first ratcheting arm is preferably pivotally connected to an end of the arm portion with a first rotary ratchet device. The first rotary ratchet device includes a recessed key lock for unlocking the first rotary ratchet device. One end of the second ratcheting arm is pivotally connected to an opposing end of the first rotary ratchet device with a second rotary ratchet device. The second rotary ratchet device includes a recessed key lock for unlocking the second rotary ratchet device. An opposing end of the second arm portion includes a plurality of ratchet teeth.

U.S. Pat. No. 4,748,875 discloses a rotary ratchet, which is herein incorporated by reference in its entirety. The pawl 60 may be released by use of a handcuff key inserted into an adjacent recessed key lock. A base ratchet pawl is located in the base member. The ratchet pawl is released with a handcuff key inserted into a base key lock cavity. U.S. Pat. No. 4,287,731 illustrates a rachet pawl locking mechanism, which is hereby incorporated by reference in its entirety. A photoluminescent paint or coating may be applied to at least one of the cuff members. It is preferable to apply or mold a resilient or rubbery substance to at least a portion of an inside surface of the first ratcheting arm and/or the second ratcheting arm to reduce the chance wrist injury to the detainee.

The cuff connecting member preferably includes an elongated member, a first ball and a second ball. The first and second balls include a hole formed through thereof to receive the elongated member. The elongated member is preferably a wire cable. The first ball is crimped on to a first end of the wire cable and the second ball is crimped on a second end of the wire cable. The wire cable is preferably coated with a plastic material. A tapered bore is formed in each base member to receive the first or second ball. A current cuff connecting member includes a swivel 26 as illustrated in U.S. Pat. No. 4,287,731. The swivel 26 is subject stress cracking between the shank portion 32 and the base portion 34. The detainee would injury their wrists when trying to break one of the swivels 26, but are still capable of inducing the stress cracking between the shank portion 32 and the base portion 34. The first and second balls in the tapered bore are not subject to stress cracking.

The monitoring device is retained on a side of a base member of one of the cuff members with a monitor rotary ratchet device. The taser is attached to a side of a base member of the other cuff member. The monitoring device preferably includes a microprocessor-based circuit, a plurality of sensors, a transceiver and a battery. A software program is installed in the microprocessor-based circuit to receive data from the plurality of sensors. The sensor data received is compared to existing ranges of normal physiological parameters. If the detainee's physiological data is outside the normal physiological parameters, an alert is sent to a law enforcement monitoring device through the transceiver. It is preferable that the plurality of sensors monitor pulse oximeter, blood oxygen saturation, skin and body temperature, heart rate, blood glucose, blood sugar level, respiration rate blood cortisol, blood pressure, electrocardiogram (ECG), pedometer, body positioning and movement. It is preferable that the monitoring device alert law enforcement through the plurality of sensors to prevent undesirable health conditions. Further, physiological sensor data may be used to form a profile of whether a detainee intends to attempt a violent confrontation; escape; or about to experience a serious medical condition. Additionally, the sensor data can be used in court to attribute the cause of the injuries sustained, while wearing the detainee monitor restraint to detainee self-inflicted injuries, mishandling by law enforcement or some other factor. The above data could be used to send an alert to law enforcement. The taser is used to control an unruly detainee. The taser is preferably a miniaturized version of a prior art taser.

It is preferable that the monitoring device use (GPS) to monitor the location of a detainee, if they should escape or become lost. The software program should also be capable of checking each sensor for functionality. It is preferable that the monitoring device be controlled by the law enforcement control device. The law enforcement control device is preferably some type of electronic device, such as a laptop computer or smart phone to eliminate any controls being accessible by the detainee. A key fob or the law enforcement control device may be used to activate the taser. The transceiver may communicate through any suitable wireless protocol, such as WiFi, Bluetooth, cellular or the like.

Accordingly, it is an object of the present invention to provide a detainee monitor restraint, which strengthens and improves the design of existing handcuffs to make it harder for a detainee to escape the handcuffs.

It is another object of the present invention to provide a detainee monitor restraint, which provides feedback of the health of the detainee; and the location of the detainee.

Finally, it is another object of the present invention to provide a detainee monitor restraint, which reduces or mitigate liability from detainee lawsuits.

These and additional objects, advantages, features and benefits of the present invention will become apparent from the following specification.

DETAILED DESCRIPTION OF THE PREFERRED EMBODIMENTS

Figure 1:
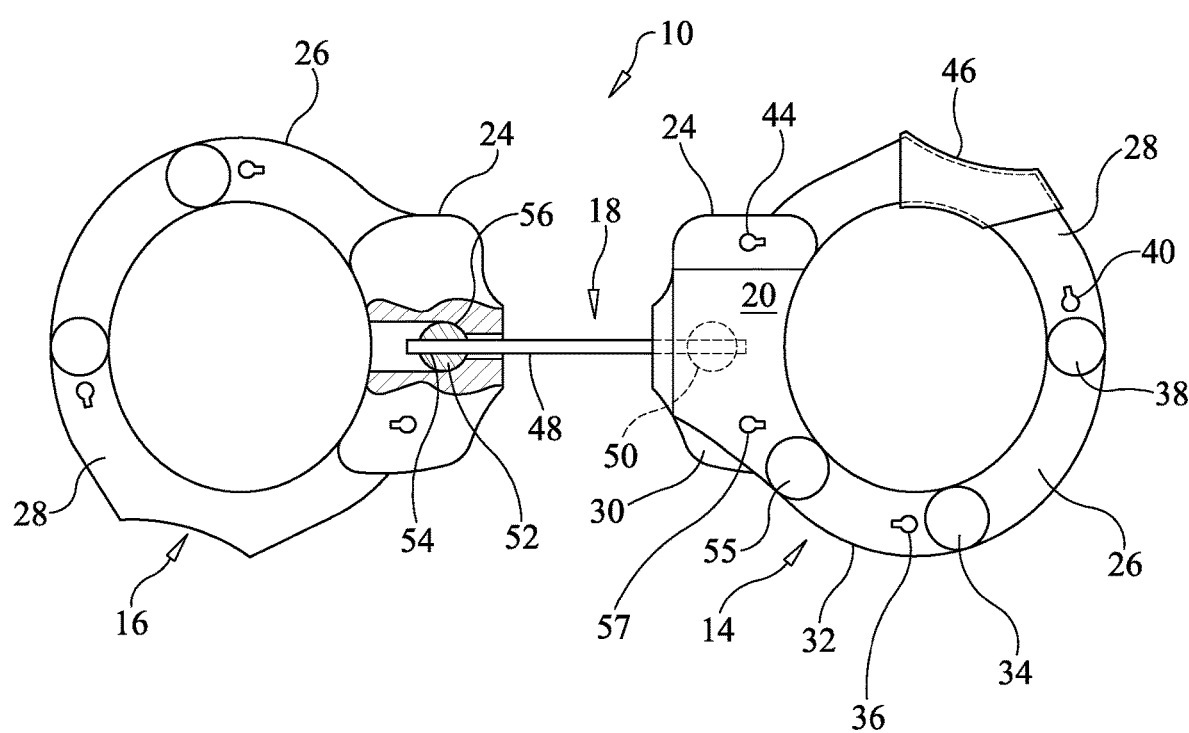
FIG. 1 is a top view of a detainee restraint of a detainee restraint monitor in accordance with the present invention.
Figure 2:
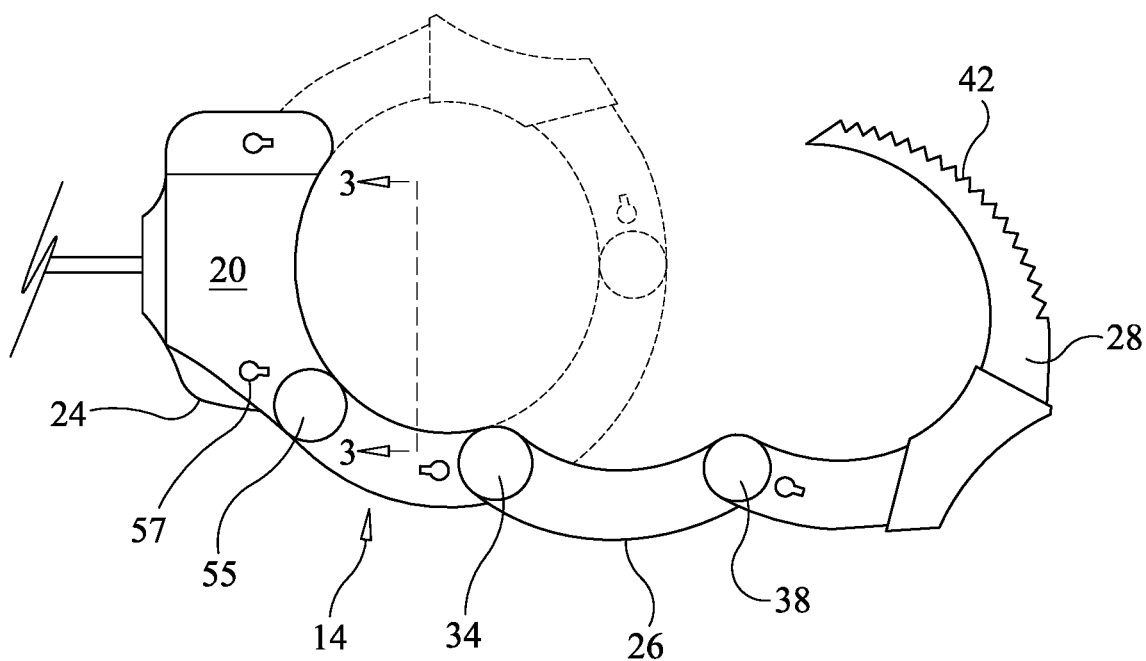
FIG. 2 is a top view of an opened cuff member of a detainee restraint monitor in accordance with the present invention.
Figure 3:
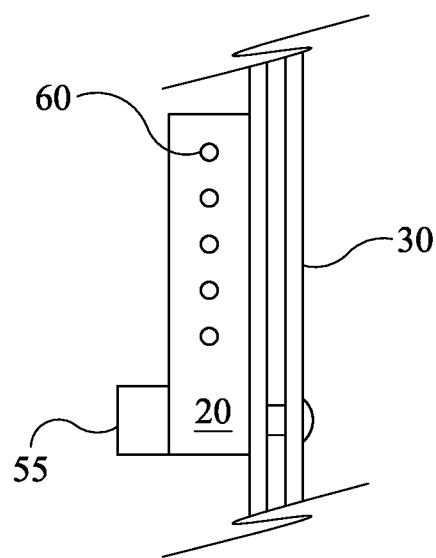
FIG. 3 is a side view of a monitoring device displaying a plurality of sensors of a detainee restraint monitor in accordance with the present invention.
Figure 4:
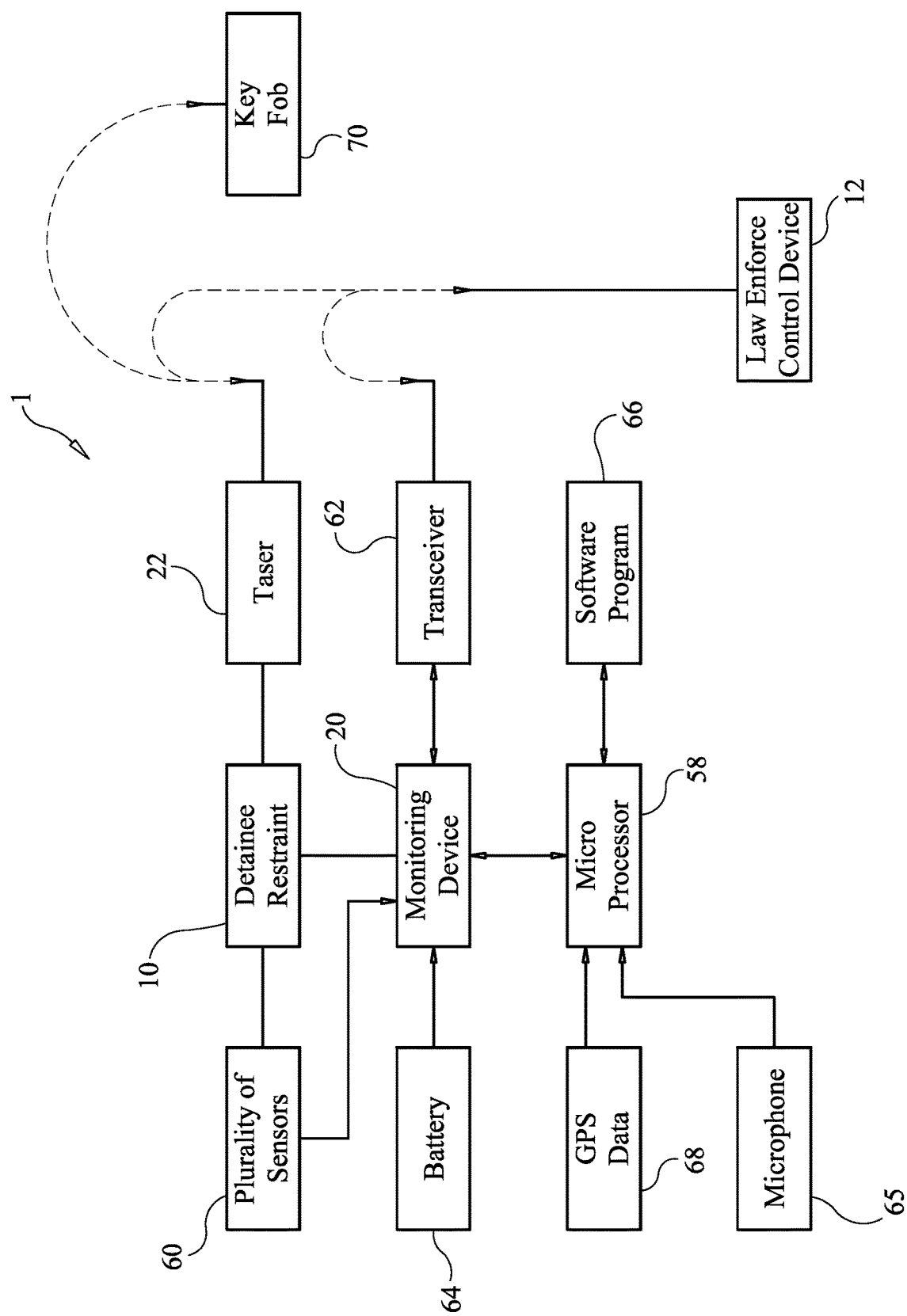
FIG. 4 is a schematic diagram of a detainee restraint monitor in accordance with the present invention.

With reference now to the drawings, and particularly to FIG. 4, there is shown a schematic diagram of a detainee restraint device 1. The detainee monitor restraint 1 preferably includes a detainee restraint 10 and a law enforcement control device 12. With reference to FIGS. 1-2, the detainee restraint 10 preferably includes a first cuff member 14, a second cuff member 16, a cuff connecting member 18, a monitoring device 20 and a taser 22. Each cuff member 14, 16 preferably includes a base member 24, a first ratcheting arm 26 and a second ratcheting arm 28. The base member 20 includes a base portion 30 and an arm portion 32. The arm portion 32 includes a curved length. The arm portion 32 extends outward from the base portion 30. The first ratcheting arm 26 includes a curved length. One end of the first ratcheting arm 26 is pivotally connected to an end of the arm portion 30 with a first rotary ratchet device 34. The first rotary ratchet device 34 includes a recessed key lock 36 for unlocking the first rotary ratchet device 34. One end of the second ratcheting arm 28 is pivotally connected to an opposing end of the first ratcheting arm 26 with a second rotary ratchet device 38. The second rotary ratchet device 38 includes a recessed key lock 40 for unlocking the second rotary ratcheting device 38. An opposing end of the second ratcheting arm 28 includes a plurality of ratchet teeth 42.

U.S. Pat. No. 4,748,875 discloses a rotary ratchet, which herein is incorporated by reference in its entirety. With application to a hand cuff, the pawl 60 may be released by use of a handcuff key inserted into an adjacent recessed key lock. A base ratchet pawl (not shown) is located in the base member. The ratchet pawl is released with a handcuff key inserted into a base key lock cavity 44. U.S. Pat. No. 4,287,731 illustrates a rachet pawl locking mechanism, which is hereby incorporated by reference in its entirety. However, the first and second rotary ratchet devices 34, 38 use a one-way ratchet wheel as opposed to a two directional ratchet wheel to ensure that the first and second ratcheting arms 14, 16 cannot be retracted without a handcuff key. It is preferable to apply or mold a resilient or rubbery substance 46 to at least a portion of an inside surface of the first ratcheting arm and/or the second ratcheting arm 14, 16 to reduce the chance wrist injury to the detainee. The rubbery substance 46 preferably includes photoluminescent pigments or a photoluminescent coating. However, a photoluminescent paint may be applied to at least one of the cuff members 14, 16.

The cuff connecting member 18 preferably includes a flexible elongated member 48, a first ball (a first spherical member) 50 and a second ball (a second spherical member) 52. The elongated member 48 is preferably a wire cable, but could be a chain or any other suitable object. The first and second balls 50, 52 include a hole 54 formed through thereof to receive the wire cable 48. The first ball 50 is crimped or secured on a first end of the wire cable 48 and the second ball 52 is crimped on a second end of the wire cable 48. The wire cable 48 is preferably coated with a plastic material. A tapered bore 56 is formed in each base member 20 to receive the first or second ball 50, 52. With reference to U.S. Pat. No. 4,287,731, a prior art cuff connecting member includes a swivel 26. The swivel 26 is the subject of stress cracking between the shank portion 32 and the base portion 34. The detainee would injury their wrists when trying to pull apart the hand cuffs to break one of the swivels 26, but are still capable of inducing a stress cracking between the shank portion 32 and the base portion 34. The first and second balls 50, 52 in the tapered bore 56 are not subject to stress cracking.

The monitoring device 20 is attached to a side of the base portion 30 of one of the cuff members 14, 16 with a monitor rotary ratchet device 55. A monitor key lock 57 may be used to lock the monitoring device 20 against a detainee's wrist. The monitor rotary ratchet device 55 uses a one-way ratchet wheel as opposed to a two-directional ratchet wheel to ensure that the monitoring device 20 cannot be retracted without a handcuff key. The taser 22 is attached to a side of the base portion 30 of the other one of the cuff members 14, 16.

The monitoring device 20 preferably includes a microprocessor-based circuit 58, a plurality of body sensors 60, a transceiver 62 and a battery 64. A software program 66 is installed in the microprocessor-based circuit 58 to receive data from the plurality of sensors 60. Sensor data received from the plurality of sensors 60 is compared to existing ranges of normal physiological parameters. If the detainee's physiological data is outside the normal physiological parameters, an alert is sent to the law enforcement monitoring device 12 through the transceiver 62. It is preferable that the plurality of sensors 60 monitor pulse oximeter, blood oxygen saturation, skin and body temperature, heart rate, blood glucose, blood sugar level, respiration rate blood cortisol, blood pressure, electrocardiogram (ECG), pedometer, body positioning and movement. It is preferable that the monitoring device 12 alert law enforcement through the plurality of sensors 60 to prevent undesirable health conditions from affecting the detainee. Further, physiological sensor data may be used to form a profile of whether a detainee intends to attempt a violent confrontation or escape. Additionally, the sensor data can be used in court to attribute the cause of the injuries sustained, while wearing detainee monitor restraint to detainee self-inflicted injuries, mishandling by law enforcement or some other factor. The above data could also be used to send an alert to law enforcement. The taser 22 is used to control an unruly detainee. The taser 22 is preferably a miniaturized version of a prior art taser. A microphone 65 is preferably connected to the microprocessor 58 to provide a recording of the detainee or anyone near the detainee.

It is preferable that the monitoring device use GPS data 68 to track a location of a detainee, if they should become lost or if they should escape. The software program 66 should also be capable of checking each one of the plurality of sensors 60 for functionality. It is preferable that the monitoring device 20 be controlled by the law enforcement control device 12. The law enforcement control device 12 is some type of electronic device, such as a laptop computer or smart phone to eliminate any controls being accessible by the detainee. A key fob 70 or the law enforcement control device 12 may be used to activate the taser. The transceiver 62 may communicate through any suitable wireless protocol, such as WiFi, Bluetooth, cellular or the like.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed:

1. A detainee monitor restraint, comprising:
   a first cuff member;
   a second cuff member; and
   a cuff connecting member having one end secured to said first cuff member and a second end secured to said second cuff member, each said cuff member includes a base member and a ratcheting arm, one end of said ratcheting arm is pivotally engaged with said base member with a ratchet device, an arm key operated pawl is formed in said base member to lock said one end of said ratcheting arm relative to said base member, a plurality of ratchet teeth are formed on an opposing end of said ratcheting arm, a base key operated pawl is formed in said base member to lock said ratcheting arm relative to said base member; and
   said ratcheting arm includes a first ratcheting arm and a second ratcheting arm, one end of said first ratcheting arm is pivotally retained on said base member with said ratchet device, one end of said second ratcheting arm is pivotally retained on an opposing end of said first ratcheting arm, an opposing end of said second ratchet includes said plurality of ratchet teeth.

2. The detainee monitor restraint of claim 1 wherein:
   said base member includes a base portion and an arm portion, said arm portion extends from said base portion.

3. The detainee monitor restraint of claim 1 wherein:
   one end of said second ratcheting arm is pivotally retained on an opposing end of said first ratcheting arm with a second ratchet device.

4. The detainee monitor restraint of claim 3 wherein:
   a key lock disengages said ratchet device, a second key lock disengages said second ratchet device.

5. The detainee monitor restraint of claim 1 wherein:
   a resilient substance is applied to at least a portion of said ratcheting arm.

6. A detainee monitor restraint, comprising:
   a first cuff member includes a first base member and a first ratcheting arm, a first tapered bore is formed through said first base member;
   a second cuff member includes a second base member and a second ratcheting arm, a second tapered bore is formed in through said second base member; and
   a cuff connecting member including a first spherical member, a second spherical member and a flexible elongated member, wherein said first spherical member is secured to a first end of said flexible elongated member, said flexible elongated member is inserted through said first tapered bore and second tapered bore, said second spherical member is secured to a second end of said flexible elongated member, an axis of said flexible elongated member is concentric with an axis of said first tapered bore and said second tapered bore.

7. The detainee monitor restraint of claim 6 wherein:
   said flexible elongated member is a wire cable.

8. The detainee monitor restraint of claim 7 wherein:
   said wire cable is coated with plastic.

9. The detainee monitor restraint of claim 6 wherein:
   an axis of said first tapered bore passes through an inner perimeter of said first cuff member, an axis of said second tapered bore passes through an inner perimeter of said second cuff member.

10. A detainee monitor restraint, comprising:
    a first cuff member includes a first base member and a first ratcheting arm;
    a second cuff member includes a second base member and a second ratcheting arm;
    a cuff connecting member having one end secured to said first cuff member and a second end secured to said second cuff member; and
    a monitoring device is retained on at least one of said first cuff member or said second cuff member, said monitoring device includes at least one sensor for determining whether at least one physiological parameter of the body of a detainee is outside a normal physiological parameter.

11. The detainee monitor restraint of claim 10, further comprising:
    a taser is retained on said first cuff member or said second cuff member.

12. The detainee monitor restraint of claim 10, further comprising:
    said monitoring device includes a microprocessor-based circuit.

13. The detainee monitor restraint of claim 12 wherein:
    a software program is installed in said microprocessor-based circuit, said software program is capable of checking said at least one sensor for functionality.

14. The detainee monitor restraint of claim 10, further comprising:
    a control device is used to remotely control said detainee monitor restraint.

15. The detainee monitor restraint of claim 10, further comprising:

a microphone is used to record audio near said detainee monitor restraint.

16. The detainee monitor restraint of claim 10 wherein:
a transceiver is connected to said monitoring device to wireless communicate with other wireless devices.

17. The detainee monitor restraint of claim 16 wherein:
data from said at least one sensor is compared to existing ranges of normal physiological parameters, if the detainee's physiological data is outside normal physiological parameters, an alert is sent to a law enforcement monitoring device through said transceiver.

18. The detainee monitor restraint of claim 10 wherein:
said detainee monitor restraint utilizes GPS data to determine a location of a detainee.

19. The detainee monitor restraint of claim 10 wherein:
said monitoring device is biased against the arm of a detainee with a rotary ratchet device.

20. The detainee monitor restraint of claim 10 wherein:
said at least one sensor in said monitoring device is located adjacent the arm of the detainee.

\* \* \* \* \*